United States Patent [19]
Saligari

[11] Patent Number: 4,757,627
[45] Date of Patent: Jul. 19, 1988

[54] PISTOL FOR SLAUGHTERING ANIMALS WITH AUTOMATIC CLOSURE BY MEANS OF THE TRIGGER

[76] Inventor: Romualdo Saligari, Via A. Rosmini, 13 Lecco (Como), Italy

[21] Appl. No.: 41,074

[22] PCT Filed: Sep. 2, 1985

[86] PCT No.: PCT/IT85/00032
§ 371 Date: Mar. 16, 1987
§ 102(e) Date: Mar. 16, 1987

[87] PCT Pub. No.: WO87/01261
PCT Pub. Date: Mar. 12, 1987

[51] Int. Cl.⁴ .............................................. A22B 3/02
[52] U.S. Cl. ........................................ 42/1.12; 17/1 B; 42/36
[58] Field of Search ............... 42/1.12, 1.14, 8, 12, 42/44, 64; 17/1 B; 89/25; 42/36

[56] References Cited
FOREIGN PATENT DOCUMENTS

| | | | |
|---|---|---|---|
| 803153 | 9/1936 | France | 42/112 |
| 246978 | 11/1947 | Switzerland | 42/1.12 |
| 322439 | 12/1929 | United Kingdom | 17/1 B |
| 329974 | 5/1930 | United Kingdom | 17/1 B |
| 339671 | 12/1930 | United Kingdom | 17/1 B |

*Primary Examiner*—Deborah L. Kyle
*Assistant Examiner*—Michael J. Carone
*Attorney, Agent, or Firm*—Michael J. Striker

[57] ABSTRACT

Pistol for slaughtering animals with captive projectile and hinged breech block, the breech block 13 being automatically locked to the breech 10 before the explosion by means of a balancing lever 37, inside the breech block, having a head 40 at one end for cocking the percussion pin 50 and a tooth 39 at the other end that fits onto a tooth 36 on the breech, the initial stroke made by the trigger 72 causing rotation of the lever 37 and hookup onto the breech 10, continuance of the trigger's stroke causing said hook-up to be strengthened, releasing the percussion pin 50 for its forward movement.

18 Claims, 6 Drawing Sheets

PISTOL FOR SLAUGHTERING ANIMALS WITH AUTOMATIC CLOSURE BY MEANS OF THE TRIGGER

BACKGROUND OF THE INVENTION

Well-known are the so-called slaughtering pistols or instruments which, by means of blank cartridges, cause a stiletto shaped projectile to emerge for several centimeters which penetrates deeply into the animal's brain which remains fatally injured thereby.

Some types are tube shaped with no hand grip and consequently difficult and unreliable to use. Other types comprise a screwed-on breech block which, though fairly safe, is slow and awkward in use.

Hinged breech blocks, especially those having transversal articulations, are in most cases manually closed by an external lever, movement of which is unreliable and unsafe. The trigger is generally placed high up on the hand grip so that the strongest fingers, like the index and middle fingers, are engaged with pressing it, and maximum strength cannot therefore be exerted by the other fingers on the hand grip itself.

In other types still the percussion pin acts on the cock through a complex series of interacting levers which make operation unreliable and faulty.

The way in which the various parts are balanced is inadequate to absorb the effect of recoil thus creating considerable problems for the operator.

The whole travel of the projectile generally determines a compression of rubber shock absorber pads with the result that final pressure of the projectile is greatly reduced and consequently is often insufficient.

The holes for gas outlet are usually too large which further decreases shooting power.

Tall horses pose the operator with considerable problems in correctly gripping the pistol.

The numerous complex parts both inside and outside the pistol require a great deal of lubrication with the risk of some of them, especially the percussion pin, becoming stuck fast in cold weather.

Construction of the barrel, breech and pistol grip in different parts associated together, often creates problems of precision.

The under part of the breech block is often so low, in relation to the grip, as to cause it to hit the operator's wrist should the animal suddenly raise its head.

The above invention avoids the above drawbacks as well as providing considerable advantages as will be explained below.

SUMMARY OF THE INVENTION

The present invention is a slaughtering pistol having a captive projectile and hinged breech block comprising an internal balancing lever whose posterior head is kept, by means of a spring also inside the breech block, on the trajectory of a gripping means fixed to the percussion pin. The upper front of the lever is shaped as a tooth and the like turned upwards having opposite it, at a very short distance, a tooth or the like, turned downwards on the breech. The lower front of the lever is a convex ridge which, when the breech block is closed, is practically in contact with the end of an arm fixed at its top to an oblong body which articulates in proximity to the arm itself inside the pistol grip.

The lower end of said oblong body, projecting from an aperture in the hand grip, acts as the trigger.

By pulling the percussion pin, its gripping means couples onto the posterior head of the breech block lever, with consequent cocking, but with the breech block closed, the percussion pin is only released by pressing the trigger. The first part of the trigger's travel, due to movement of the extremity of its upper arm, causes the front part of the breech block lever to move sufficiently to lock the breech block's tooth into the tooth of the breech and this locks the breechblock.

A further part of the trigger's travel brings about a more extended coupling of the above teeth, lowering of the posterior head of the lever which becomes detached from the percussion pin's gripping means, with release of the percussion pin towards the cartridge which consequently explodes. The percussion pin substantially consists of a small cylindrical rod with a percussion tip, a gripping means that is formed of a disk fixed to the rod in proximity to its tip, and a cylindrical spiral spring placed round the rod. The spring determines a reaction between the disk and a coaxial ring nut fixing it in place.

Said percussion pin is situated within the body of said breech block and, when the latter is closed, the percussion pin is aligned with the cartridge and the captive projectile. The projectile substantially consists of a small cylindrical rod of a practically constant diameter, the back end of which, destined to remain in the compression chamber, is separated from the front end, with its point that will penetrate into the animal's brain, by a fixed disk.

In the breech there are three cylindrical aligned chambers: the explosion chamber containing the cartridge, the compression chamber containing the back end of the projectile and the expansion chamber in which lies the front end of the projectile almost of the same diameter as that of the disk casing which separates the back end of the projectile from the front end.

The barrel has external threading for screwing on the barrel which lengthens the barrel, said casing formed of a cylinder closed at one end and with a central hole through which the front end of the projectile passes.

The inside of the barrel casing extending the barrel is practically filled up by disk-shaped polyurethane foam pads, for absorbing the shock set up by the explosion, and said pads are pressed by the disk fixed onto the captive projectile.

The travel of this latter is free for the whole length of the expansion chamber, practically corresponding to the length of the barrel.

The expansion chamber has a cylindrical nylon lining whose inside diameter slightly decreases towards the outside of the barrel better to soften the return movement of the projectile after the explosion.

The extractor consists of an oblong body situated in a cavity of the breech parallel to the compression chamber and placed between said compression chamber and articulation of the breech block.

Said articulation is formed of an ear-shaped projection fixed to the breech block and interposed between a pair of ear-shaped projections fixed to the breech.

The first ear-shaped projection is fitted with a tooth set radially in relation to the articulation, and thin so that when the breech block is opened, said tooth enters a cavity in the breech and touches the back end of the extractor and then, pushing it outwards, determines by means of a fixed tang, expulsion of the exploded cartridge.

The trigger is kept in a non-shooting position by a compression spring placed between the trigger's oblong body and the internal side of the back of the hand grip.

The hand grip is made long enough to avoid contact between the lower part of the breech block and the wrist of the operator even if the animal were suddenly to raise its head.

The trigger, consisting of the lower extremity of the oblong body with articulation inside the hand grip, lies in proximity to the little finger and the fourth finger while the middle and index fingers can rest on the upper part of the hand grip in order to exert maximum strength and maximum stability during the severe stresses set up by the explosion.

All the main parts such as the breech, hand grip, barrel casing, breech block, projectile, extractor, percussion pin, breech block lever, trigger body, various springs, shock absorbers, articulation pins in the breech block and lever, and others are longitudinally crossed by a single geometrically plane of symmetry to ensure maximum equilibrium among all the weights as well as maximum structural and functional simplicity.

The breech, hand grip and barrel are made in a single piece cast in wax.

About half way along the expansion chamber on the barrel casting, small outlet holes are cut to ensure the best control of the forces set up by formation of gas.

Similarly at the end of the compression chamber, small holes are cut in the breech.

On each side of the breech there is a nylon pad, the two pads being paired together by a bridge across the upper part of the breech itself. Inside each pad there are longitudinal ducts matching the outlet holes in the breech through which the gas can escape thus reducing the noise and heat caused by the explosion. The thread on the outside of the barrel is rounded to facilitate cleaning.

A rigid polyurethane disk is placed among the shock-absorbing pads. The hole in said disk through which the projectile passes, has a diameter smaller than the external diameter of said projectile and this, due to the friction thereby caused, prevents it from accidentally leaving the mouth of the pistol.

In the lower part of the breech block there are expanding points whose inner sides symmetrically embrace the two sides of the breech, on one side and on the other.

These expansions contain cylindrical chambers facing towards the breech, each one having inside it a sphere which is caused, by pressure from an internal spring, to project from a smaller hole in the walls and, when the breech block is closed, said spring penetrates inside a concave niche in the sides of the breech keeping the breech block closed against accidental opening.

DESCRIPTION OF THE PREFERRED EMBODIMENT

The pistol comprises the breech 10, hand grip 11, barrel 12 all built from a single piece of metal. The breech in turn comprises the cylindrical explosion chamber 16 in which the cartridge 15 with base 31 is placed, the cylindrical compression chamber 17 coaxial with and having a bigger diameter than the first chamber, the cylindrical expansion chamber 18 which has a much larger diameter. The posterior end 20 of the rod-shaped captive projectile 19 comprising the disk-shaped head 21 and the tubular extremity 22 with cylindrical hole 23 and tip 97, are housed in the chamber 17 where there is a small amount of play. Chambers 16, 17, 18 are coaxial.

The nylon barrel casing 24 fits inside chamber 18 and is further held in place by the raised edge 25 of the barrel 12, said casing being slightly tapered towards the inside of the barrel.

The internal diameter of the barrel casing is slightly larger than that of the disk-shaped head 21 of the projectile. The breech also has cylindrical chamber 26 for the extractor 27 to which the extraction tooth 28 is fixed, sunk in a niche 29 made for it in the wall 30 of the breech.

The barrel has rounded external threading 32, easy to clean and keep free from rust.

The breech has at its top a pair 33 of longitudinal projections with which to articulate, round the pin 34 of the breech block 13, by means of the ear-shaped projection 77 on the breech block, said projection being placed between the first two.

Lower down there is the niche 35 with tooth 36 which fits into tooth 39 of the lever 37 of the breech block. Said lever articulates on the moveable pin 38 supported by the breech block and comprises the posterior head 40 for fitting onto the percussion pin, the convex ridge 41 to be pressed by the trigger, as will be explained, and the tang 42 with pin 43 for working the cylindrical spiral spring 44 placed in chamber 45 of the breech block.

The lower extremity of the spring is guided and held by the head 46 of the plate 47, inserted within a corresponding posterior seat in the breech block, and is fixed by the ring nut 48 of the percussion pin 50, which ring nut penetrates inside a special hole 49 in the plate itself.

The percussion pin 50, lodged in the chamber 56 of the breech block, comprises the small cylindrical rod 51 with percussion tip 52 and the fixed disk 53 where a cylindrical spiral compression spring 54 reacts and fits against the inside of the ring nut 48 which screws into the threaded seat 55 of the breech block.

The manual pulling ring 57 is applied to the rod 51 through the transversal hole 56.

The barrel 12 is extended in length by means of the barrel casing 60 with its inside threading 61 for screwing onto the external thread 32 of the barrel.

In the flat end 62 of the barrel casing there is a central hole 63 through which the front part 22 of the projectile 19 comes out when the cartridge has exploded.

On part 22 of the projectile the disk-shaped nylon bushing 64 is inserted, its external diameter being practically the same as the internal one of the barrel casing 60, destined to fit against the external edge of the barrel 12 and the four disk-shaped foam polyurethane pads 65, 66, 67, 68 in the middle of which is interposed the thin elastic disk 69 made of rigid polyurethane whose outside diameter is practically the same as the internal one of the barrel casing 60.

In the middle of disk 69 a hole 101 is made having a diameter smaller than the external constant diameter of the front part 22 of the rod-shaped projectile and therefore said rod becomes fixed into the hole with a slight effort. There is a cavity in the hand grip 11 suitable for receiving the oblong body 70 articulated on the pin 71.

Said body 70 has the lower extremity 72 which partially emerges, like a trigger, from the aperture 73 in the hand grip, and the upper arm 74 on the side opposite to the articulation 71.

Figure 3:
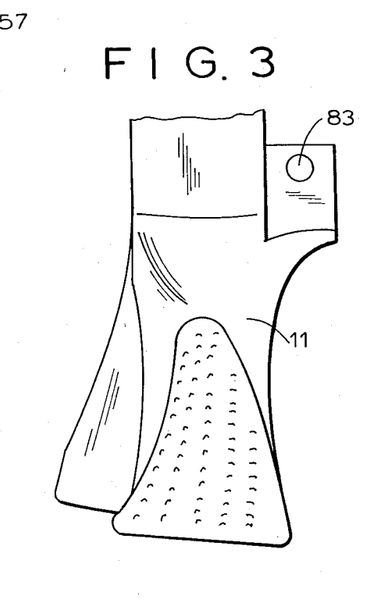
FIG. 3. Detail of breech block coupling onto the breech.

At its extremity 75 said arm is shaped in a curve suitable for matching the convex ridge 41 of the breech block lever 37 when it is in the closed position shown in FIGS. 1, 4–6. The spiral compression spring 76 reacting between the trigger 72 and the inside face of the back of the hand grip 11 keeps the trigger itself in the relaxed position shown in FIGS. 1, 3–4.

On its lower sides below its articulation on pin 34, the breech block has two symmetrical expansions 99 containing the cylindrical chambers 79 holding the small spheres 80 kept pressing against a smaller hole 81 than the internal faces of said expansions, by means of the compression spring 82.

Figure 8:
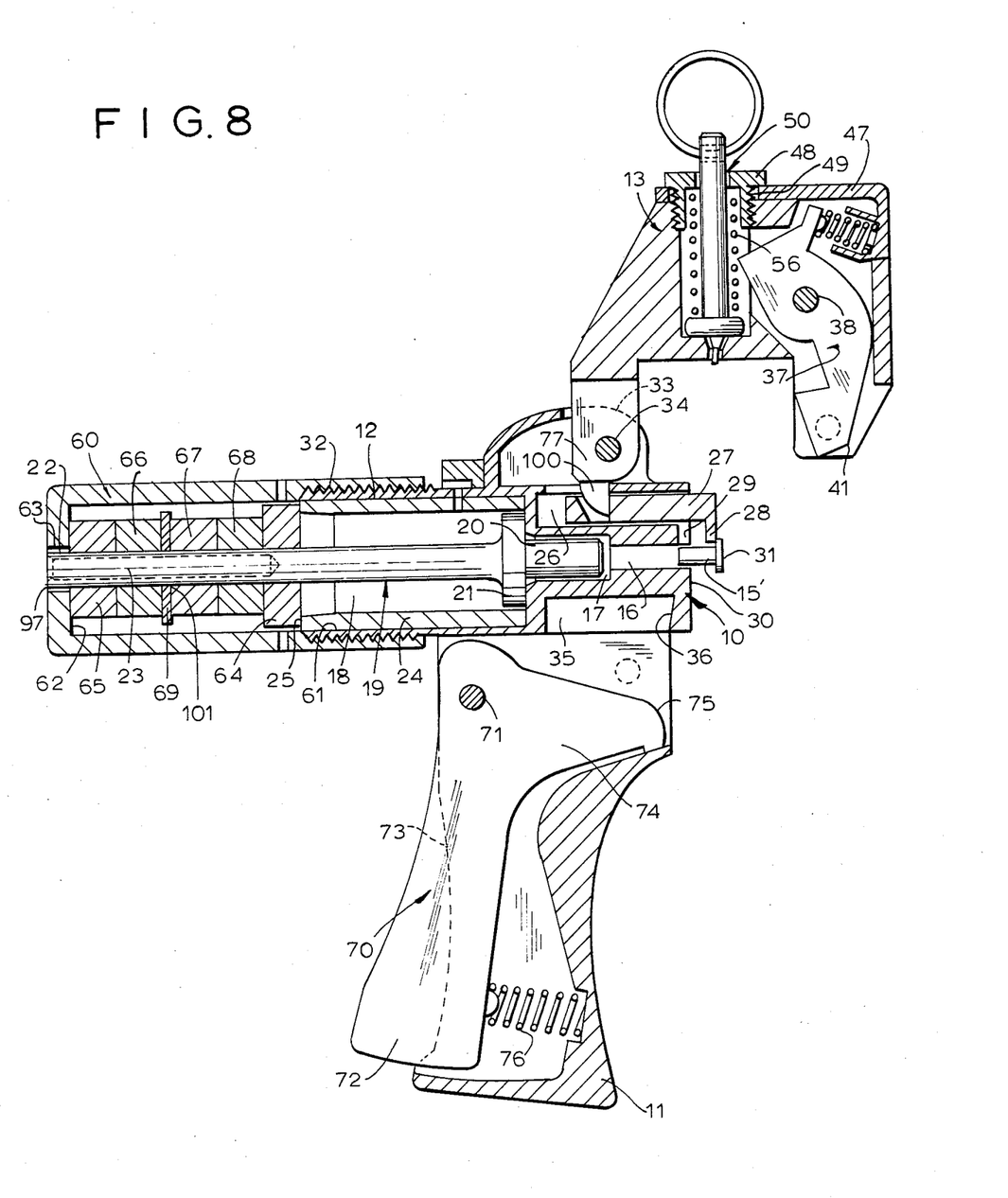
FIG. 8. Longitudinal section view of the pistol during the extraction stage.

When the breech block is closed, said small spheres penetrate into the concave niches 83 made in the sides 84 of the breech, stabilizing closure against accidental opening. It is clear, however, that if pressure is exercised on the breech block greater than that applied by the springs, said breech block can open by rotating round the pin 34 (FIG. 8). The two sides 84 of the breech are protected by the pair of nylon pads 85 connected by the bridge 86 and fixed to the breech by the bolt 98 passing between the breech and the hand grip. Said pads protect the pistol in the event of its being dropped.

Outlet holes like 90, 91 are made on the barrel casing that extends the barrel, about half way along the expansion chamber.

More holes like 92, 93 are similarly made on the sides of the breech at the point where the compression chamber ends. Said holes are masked by the lateral pads 85 whose longitudinal ducts like 94 and 95 are situated where these holes are made and allow gas to escape through holes 92, 93 thus lessening both noise and heat.

How the pistol works

Figure 1:
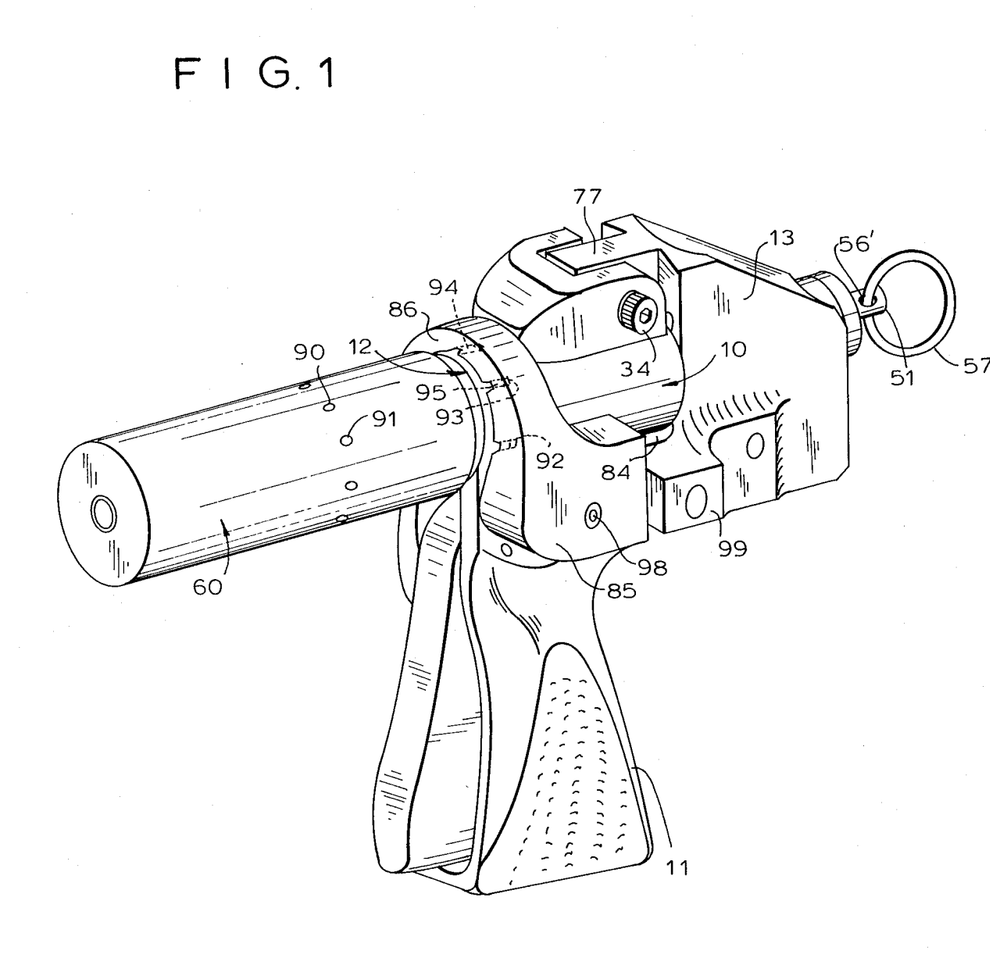
FIG. 1. An outside perspective view of the pistol.
Figure 2:
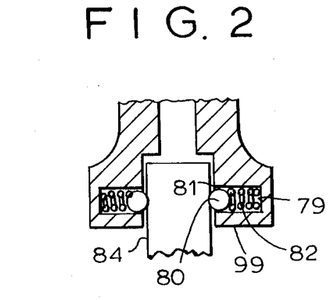
FIG. 2. Detail of breech block coupling seen in cross section.

Assuming that the first animal has been killed, the breech block is opened by rotating it upwards (FIG. 1).

By this rotation the hook 100 on the breech block's ear-shaped projection 77 will cause partial emergence of the extractor 27 whose tooth 28 will cause the exploded cartridge 15' to be expelled.

Figure 4:
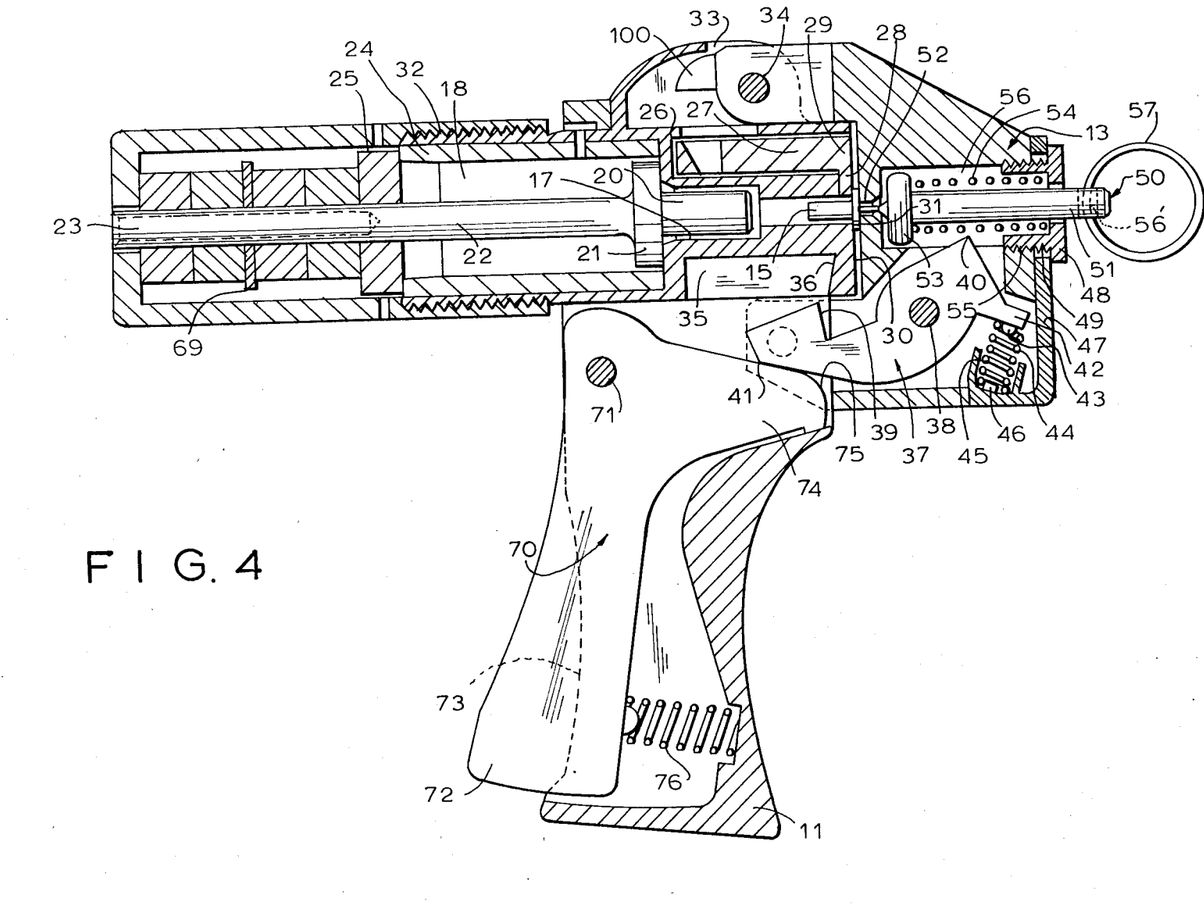
FIG. 4. Longitudinal section view of the pistol uncocked.

In this way a new cartridge 15 (FIG. 4) can be placed in the explosion chamber 16 and the breech block closed again (FIGS. 1 and 4).

The rod-shaped projectile has meanwhile automatically gone back inside the pistol due to reaction by the shock absorbers.

This has happened overcoming the resistance created by friction between the hole in disk 69 and the projectile rod, it being this resistance that prevents accidental partial emergence of the projectile.

At this point the pistol is ready for further use. To use it again the percussion pin is cocked by pulling the ring 57 (FIG. 5) and at the same time compressing the spring 51.

Figure 5:
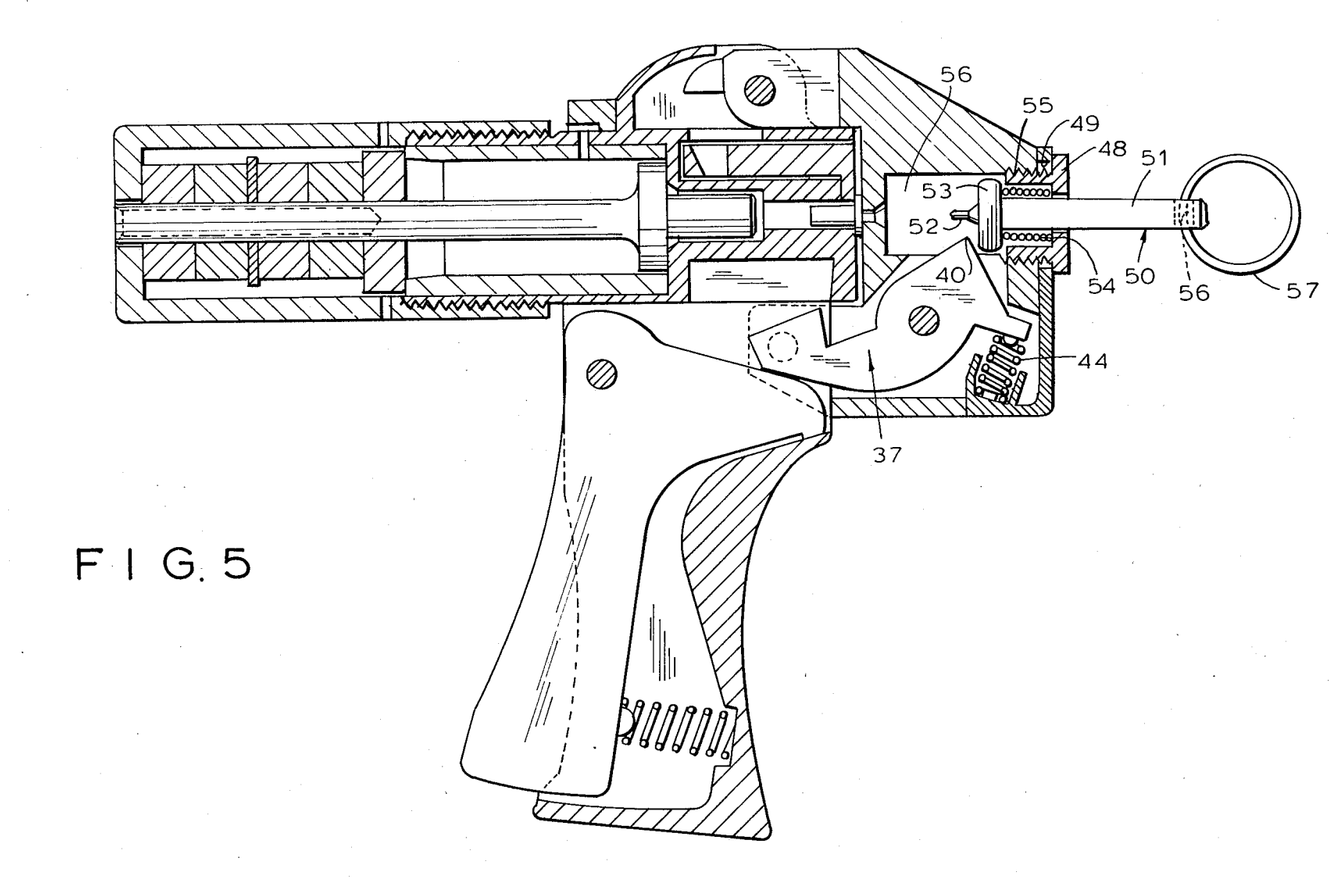
FIG. 5. Longitudinal section view of the pistol cocked.

When disk 53 of the percussion pin has passed over the posterior head 40 of lever 37, due to elastic reaction of the spring 44, head 40 is immediately brought back against said disk 53, thus keeping the percussion pin cocked as indicated in FIG. 5.

The pistol mouth is then placed against the animal's head and the trigger 72, at the lower extremity of the oblong body 70 (FIG. 6) is pressed.

Figure 6:
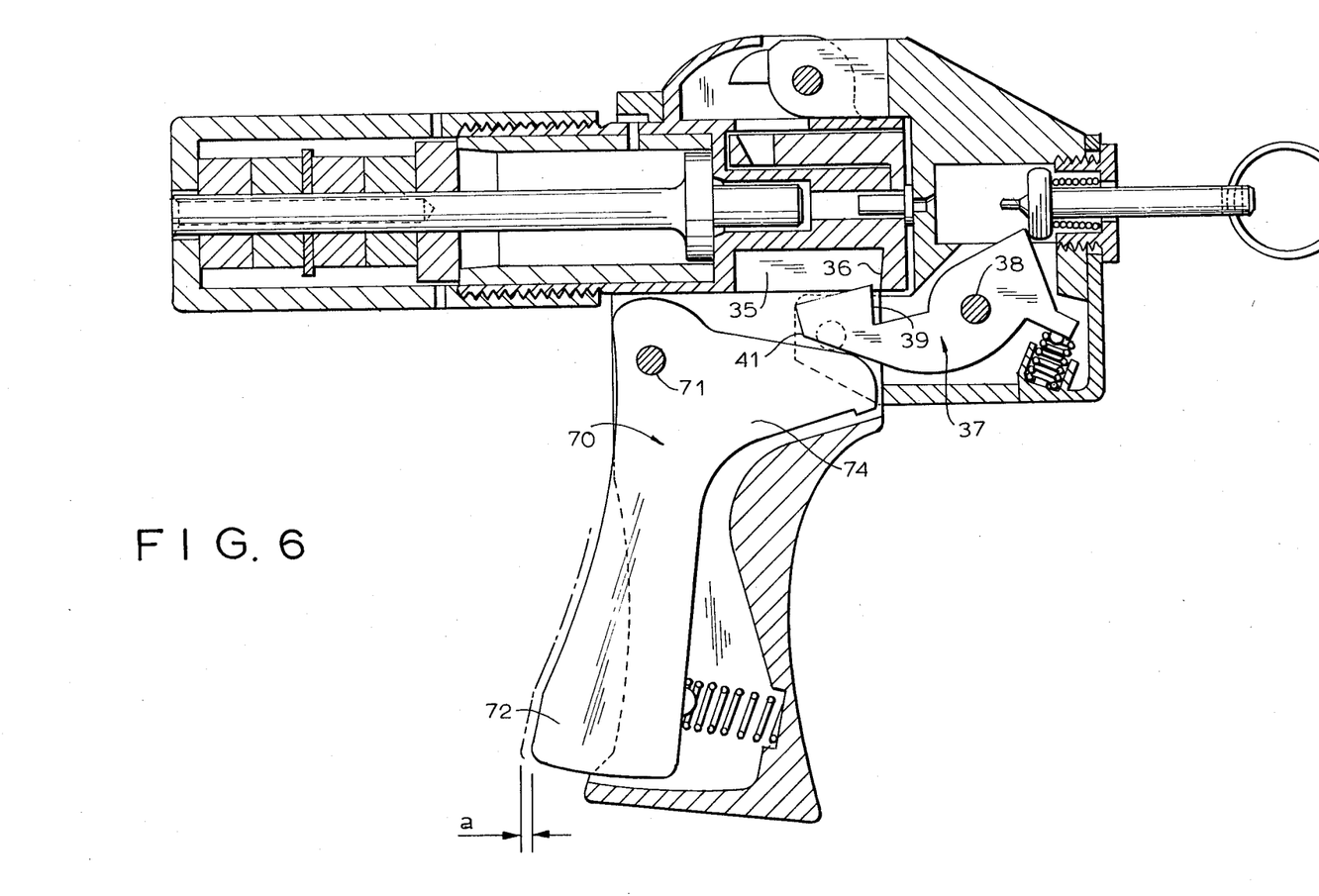
FIG. 6. Longitudinal section view of the piston with the breech block locked.

Due to arm 74 rising up, the first stroke (a) (1–2 mm) of the trigger causes the ridge 41 of breech block lever 37 to rise, rotation of said lever round pin 38 and penetration of its tooth 39 inside niche 35 in the breech and consequent hold on the breech's tooth 36.

During this phase the breech block is locked and cannot be opened on account of the very strong tractive force exercised by tooth 39 of lever 37 on tooth 36 of the breech. By maintaining pressure on the trigger, further rotation by lever 37 round its pin causes the head 40 to move downwards and free disk 53 of the percussion pin which moves sharply towards the cartridge hitting it with tip 52.

Figure 7:
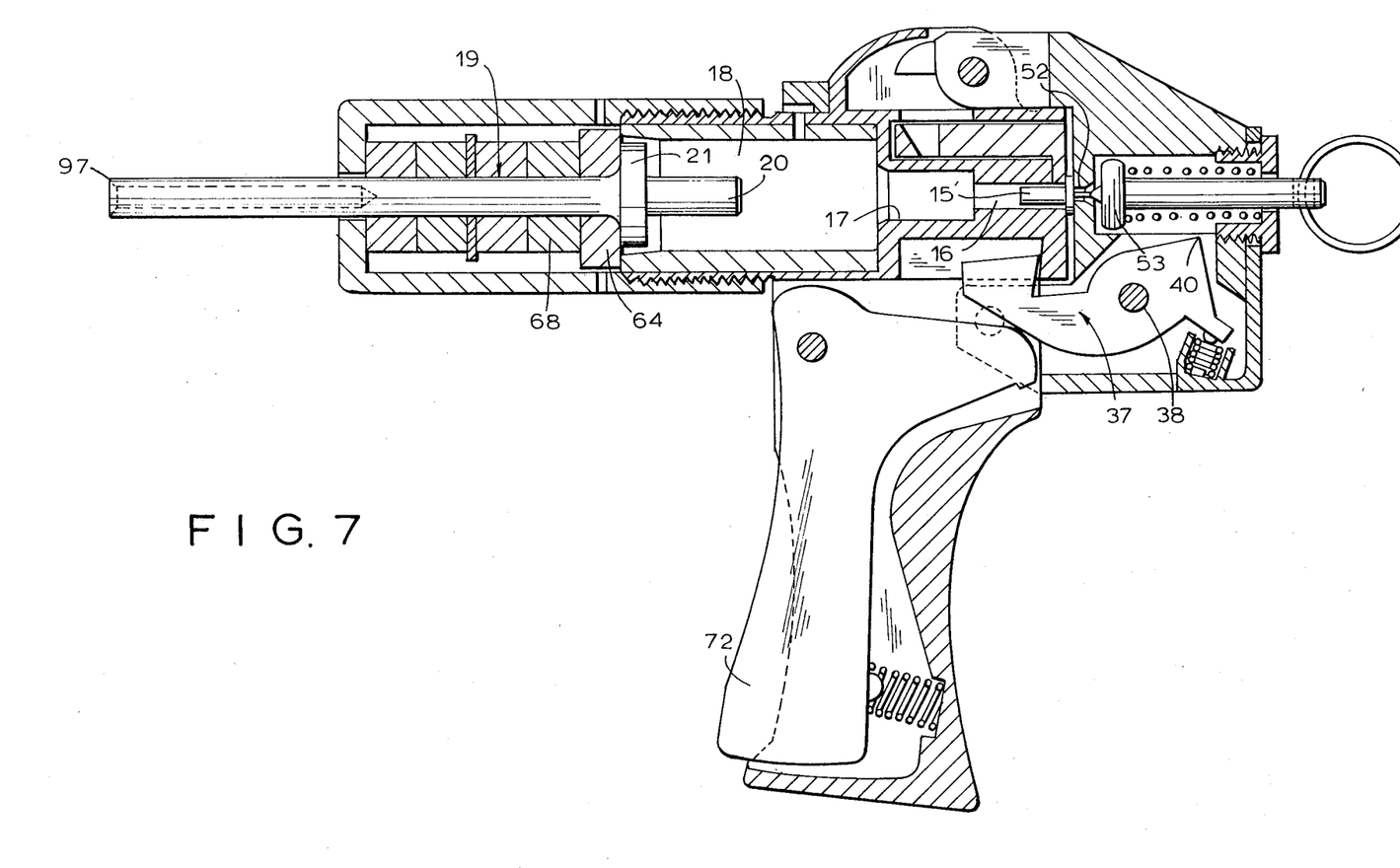
FIG. 7. Longitudinal section view of the pistol after the explosion and before automatic return of projectile.

Explosion having taken place in chamber 16, resulting gas rapidly increases pressure in chamber 17 with consequently sudden movement of end 20 of the projectile which advances allowing gas to expand in chamber 18. When the head 21 of the projectile reaches pads 64–68, thrust is partially absorbed by said pads without however preventing sudden emergence of tip 97 of the projectile over the entire amplitude of expansion chamber 18, wounding the animal to death (FIG. 7).

To prepare the pistol for further use it is sufficient to open the breech block (FIG. 8), with expulsion of the cartridge as already explained, by means of the extractor, and put in a fresh cartridge.

Advantages

Closure of the hinged breech block is automatic and is caused when the trigger makes its first short stroke. Since the percussion pin is released only after the breech block is closed, determined by the trigger itself, it is absolutely certain that no explosion can occur with the breech block open or half open.

Though the breech block is "hinged", and therefore of the quickest and most convenient kind, the percussion pins is "in line" with the cartridge and the barrel.

The positioning of weights and various structures, optimum shock absorption, the particular sizing of the explosion—compression—expansion chambers, anatomically shaped hand grip, outlet holes at the extremity of the compression chamber and half way along the expansion chamber, of limited size, make recoil almost unnoticeable.

Having the hand grip in one piece with the breech makes the pistol strong and light at the same time.

The hand grip is so shaped as to make the piston easy to use even for tall horses.

Axial percussion, with percussion tip aligned with the slim cylindrical body of the percussion pin, in turn cocked by axial pull on a ring centered on said body, avoids the risk of the mechanism sticking in winter due to lubrication becoming frozen as occurs with other well-known types of pistol.

The tapered form given to the nylon bushing fitted into the barrel and therefore in the expansion chamber absorbs recoil thrust without the risk of any kind of breakages.

All breech block mechanical parts, like levers, springs, pins and the like are inside the body of the breech block itself and are therefore well protected from blows or falls. The pads on the sides of the breech are highly effective in reducing the noise of shooting and in protecting the pistol if accidentally dropped.

Pressure being applied to the trigger by the fourth and little fingers, and use of the thumb, index and middle fingers for the main function of gripping and support, ensure exceptional stability in holding the pistol and the best possible use of it at the most difficult moment of shooting the animal.

All the principle movements before actual shooting are reversible.

The fresh cartridge put in can be taken out before the explosion by opening the breech block.

Before shooting the breech block can be easily opened overcoming resistance opposed by the springs which press on the lateral spheres.

Up to the moment when the shot is fired the breech block can be unlocked by releasing pressure on the trigger and allowing said trigger to resume its relaxed position (a stroke of less than 1.5 mm).

Maximum accuracy is assured by the breech being in one piece with the barrel.

The thread for extending barrel length is rounded without cavities or sharp depressions which make cleaning difficult and encourage formation of rust.

Having the pads made of foam polyurethane instead of rubber ensures much better absorption of shock from the shot than is obtained in the usual pistols.

As the lower part of the breech block is considerably higher than the hand grip, the breech block will thereby be prevented from touching the operator's wrist even if the animal suddenly lifts its head.

The fact that the metal structure of the pistol with the barrel, breech and hand grip are made in a single piece by a wax casting, considerably lightens overall weight though making the pistol much stronger than competitive brands. The percussion pin can be uncocked after opening by simply moving its internal lever.

The advantages may thus be summarised: safe operation, strength, a constantly optimum function in any weather, unlimited life, easy to maintain and simple to use.

I claim:

1. A pistol having means accomodating a captive projectile and a cartridge to be exploded, the pistol comprising:
    a hand grip (11) with an edge (73);
    an oblong body (70) hingably mounted and spring biased in said hand grip (11), said oblong body (70) having a trigger portion (72) projecting outward beyond said edge (73) and being arranged so that said oblong body (70) rotatably pivots when said trigger portion (72) is squeezed inward relative to said hand grip (11);
    a breech (10) formed to accomodate a cartridge (15) to be exploded in the pistol;
    a breech block (13) defining a trajectory path (56) to said breech (10) where said cartridge is to be accomodated, said breech block being hingably mounted to swing upwardly and forwardly to said breech (10);
    an internal balancing lever (37) pivotally mounted in said breech block (13) and having a projection (40) movable into said trajectory path (56);
    a percussion pin (50) spring biased in said breech block along said trajectory path (56) toward said breech (10) where said cartridge (15) is to be accomodated;
    spring means (44) for maintaining said projection (40) in said trajectory path (56);
    means for holding (53) said percussion pin (50) against said projection (40) when said percussion pin (50) is in a cocked position in which said projection (40) is in said trajectory path (56) and said percussion pin biases against said projection (40);
    means for rotatably pivoting said internal balancing lever (37) when said trigger portion (72) is squeezed inward relative to said hand grip (11) and including an arm (74) extending from said oblong body (70) and arranged to press against said internal balancing lever (37) when said trigger portion (72) is squeezed inward relative to said hand grip (11); and
    means for fittably locking said breech (10) and said breech block (13) together after squeezing said trigger portion (72) a predetermined amount and including two teeth (36, 39), one of said two teeth (36) being formed on said breech (10) and the other of said two teeth (39) being formed on said internal balancing lever (37), said two teeth being arranged relative to each other to fittably lock said two teeth in each other when said trigger portion (72) is squeezed causing said arm (74) to rotatably pivot said internal balancing lever (37) and therefore said other of said teeth (39) against and along said one of said teeth (36) of said breech (10), said trigger portion (70) being thereafter squeezable further inward to further rotatably pivot said internal balancing lever to cause a tighter grip between said two teeth (36, 39) and to cause release of said projection (40) from said holding means (53) and therefore from said percussion pin (50) so that said percussion pin (50) consequently biases sharply forward along said trajectory path and into contact with a cartridge accomodated by said breech (10) thereby causing the cartridge to explode.

2. The pistol as defined in claim 1, wherein said percussion pin (51) is formed as a small cylindrical rod (51) with a percussion tip (52), said holding means being formed as a disc (53), said disc (53) being fixed to said rod (51) close to said tip (52); further comprising:
    means for spring biasing said percussion piston and including a spiral spring (54); and
    means for fixing said spiral spring (54) to said breech block (13) and including a coaxial ring nut (48), said spiral spring (54) being arranged between said disc (53) and said coaxial ring nut (48) so that when said breech block (13) is in a closed position relative to said breech (10) in which a cartridge (15) in said breech (10) is inaccessible and the cartridge (15) and the captive projectile (19) are aligned with each other, said percussion pin (50) is aligned with and biased toward the cartridge (15) and the captive projectile (19).

3. The pistol as defined in claim 1, wherein said breech (10) includes an elongated barrel (12) extending therefrom; further comprising:
    a captive projectile (19) movable in said barrel (12) and formed as a small cylindrical rod with a practically constant external diameter and a disc (21) fixed to said cylindrical rod, said cylindrical rod having a back portion (20) and a front portion (22) with a tip (97), said disc (21) being fixed between and thereby separating said front portion (22) and said back portion (20), said tip (97) being formed to penetrate into the brain of an animal to be slaughtered.

4. The pistol as defined in claim 3, wherein said breech (10) forms three cylindrical chambers aligned with each other, a first of said three chambers being formed to accomodate the cartridge (15) so as to constitute an explosion chamber (16), a second of said three chambers being formed to accomodate the back portion of the captive projectile so as to constitute a compression chamber (17), and a third of said three chambers being formed to accomodate a front portion of the captive projectile with said disc (21) so as to constitute an expansion chamber (18).

5. The pistol as defined in claim 4, wherein said breech (10) has a barrel (12) extending therefrom, said barrel (12) defining said expansion chamber (18) and being formed with means for regulating forces exerted by an explosion of the cartridge in said explosion chamber and including a plurality of first outlet holes arranged about halfway along said barrel (12).

6. The pistol as defined in claim 5, wherein said barrel (12) has a beginning portion adjacent to said breech (10); further comprising:
escape means for gas so as to lessen noise and heat and including a plurality of second outlet holes (92, 93) spaced apart from each other and arranged in said beginning portion.

7. The pistol as defined in claim 6, wherein said breech (10) has opposite sides (84) and a top between said opposite sides (84); further comprising:
means for reducing noise and heat of an explosion of the cartridge and for allowing gas from said explosion to escape and including a cushion pad with a plurality of longitudinal ducts (94, 95) inside said cushion pad, said pad having two nylon pad portions (85) and a bridge pad portion (86) joining said two nylon pad portions (85) together, each of said two nylon pad portions being arranged on a respective one of said opposite sides (84) of said breech (10) and said bridge pad portion (86) extending across said top of said breech (10), each of said longitudinal ducts (94, 95) being arranged to match up with a respective one of said second outlet holes (92, 93).

8. The pistol as defined in claim 3, wherein said breech (10) includes and elongated barrel (60), wherein said barrel (60) has an external surface with a rounded type of thread (32); further comprising:
an elongated barrel casing (60) screwed onto said thread (32) of said barrel (12) and longitudinally extending outward from said barrel (12), said barrel casing (60) forming a centrally arranged mouth (63) through which said front portion (22) of said cylindrical rod of said captive projectile (19) is passable.

9. The pistol as defined in claim 8, wherein said barrel (12) has a length, said barrel casing (60) forming an elongated space therein extending said length of said barrel (12); further comprising:
means for accomodating movement of said captive projectile (13) through said barrel (12) and including said barrel (12) forming an expansion chamber (18), said expansion chamber (18) being formed to accomodate a movement of said captive projectile including said disc (21) and having an entire length less than that of said barrel (12); and
means for absorbing a shock of an explosion of the cartridge and including a plurality of disc-shaped foam polyurethane pads (65-68) practically filling said elongated space, said pads being arranged so that said disc (21) presses against said pads (65-68) after said captive projectile travels freely along said entire length of said expansion chamber (18).

10. The pistol as defined in claim 9; further comprising:
means for preventing an accidental exiting of said captive projectile through a mouth of the pistol and including a rigid polyurethane disc (69) with a central hole (101) formed with an inner diameter less than said external diameter of said captive projectile so that friction between said captive projectile and said rigid polyurethane disc (69) resulting from said captive projectile passing through said central hole prevents the accidental exiting of said projectile from the mouth of the pistol.

11. The pistol as defined in claim 1, wherein said breech (10) has an elongated barrel (12) through which the captive projectile is movable from an explosion of the cartridge when firing a shot; further comprising:
means for deadening a return blow of the captive projectile after the shot has been fired and including cylindrical nylon bushing lining said barrel inside, said bushing having a diameter tapering inward so as to deaden the return blow of the captive projectile.

12. The pistol as defined in claim 1, further comprising:
means for hinging said breech block (13) to said breech (10) and including a pair of longitudinal projections (33) each extending from said breech (10), said hinging means also including a pair of ear-shaped projections (77) each extending from said breech block (13), said hinging means also including a pin (34) extending through and cooperating with said ear-shaped projections (77) and said longitudinal projections (33) so that said breech (10) and said breech block (13) are articulated with each other about said pin (34); and
means for expulsing the cartridge (15) after the cartridge has exploded producing an exploded cartridge (15') and including an extractor (27) with an oblong body, a cavity (26) formed in said breech and in which said extractor (27) is movably arranged, an expulsion tooth (100) lying radially relative to said pin (34) and extending from one of said ear-shaped projections (77) so that said expulsion tooth (100) pushes said extractor (27) outward from said cavity (27) when said breech block (13) is moved into an open position in which said expulsion tooth (100) enters into said cavity (26), said extractor (27) being formed so that when the exploded cartridge (15') is arranged in said breech (10) and said extractor (27) is pushed outward from said cavity (27) by said expulsion tooth (100), said extractor (27) expulses the exploded cartridge (15') from said breech (10).

13. The pistol as defined in claim 12, wherein said breech (10) has a barrel (12) extending therefrom; further comprising:

a captive projectile movable in said barrel (12), all of said breech (10), said barrel (12), said hand grip (11), said breech block (13), said projectile (19), said extractor (27), said percussion pin (50), said internal balancing lever (37), and said oblong body (70) being arranged so that each has a common plane passing longitudinally therethrough.

14. The pistol as defined in claim 12, wherein said breech (10) has a barrel (12) extending therefrom, said breech (10), said barrel (12) and said hand grip (11) being composed of a single piece of metal cast in wax.

15. The pistol as defined in claim 1, wherein said breech block (13) has a lower part closest to a wrist of an operator when the operator holds said hand grip (11), said hand grip (11) is formed to have a length such that when the operator holds said hand grip (11), the wrist of the operator does not contact said breech block (13) even when the operator moves the pistol in response to a sudden raising of a head of an animal to be slaughtered.

16. The pistol as defined in claim 1, wherein said hand grip (11) has a remaining portion between said trigger portion and said breech (10), said hand grip (11) being formed so that when an operator holds said hand grip (11), said trigger portion (72) lies in proximity to a little finger and a fourth finger of the operator and on said remaining portion rests the middle and second fingers of the operator so as to enable the operator to apply maximum strength and ensure maximum stability during great stresses caused by an explosion of the cartridge.

17. The pistol as defined in claim 1, wherein said breech (10) has opposite sides (84); further comprising:
means for stabilizing closure of said breech block (13) with said breech (10) against accidental opening and including two expanded areas (99) each symmetrically embracing a respective one of said sides (84) of said breech (10) and each defining a cylindrical chamber therein facing said breech (10), a sphere (80) in each of said cylindrical chambers, a niche (83) formed in each said opposite sides (84) of said breech (10), and second spring means biasing each of said spheres (80) so that when said breech block (13) relative to said breech (10) is in a closed position in which the cartridge (15) is not accessible, said second spring means biases each of said spheres (80) to penetrate into a respective one of said niches (83).

18. A pistol for slaughtering animals, the pistol having means accomodating a captive projectile and a cartridge to be exploded, the pistol comprising:
a hand grip (11) with an aperture (73);
a percussion pin (50);
holding means (53) fixed to said percussion pin (50);
a breech (10) with a tooth (36) and formed to accomodate a cartridge to be exploded;
a breech block (13) defining a trajectory path (56) to said breech (10) where said cartridge is to be accomodated, said breech block (13) being hingably mounted to swing upwardly and forwardly to said breech (10), said percussion pin (50) and said holding means (53) being arranged so as to be movable along said trajectory path;
an internal balancing lever (37) with a back head (40), a front top portion with a tooth (39), a lower end portion with a convex ridge (41), said internal balancing lever being pivotally mounted to said breech block (13), said breech block (13) being formed so that said back head (40) is movable into said trajectory path;
means for maintaining said back head (40) in said trajectory path of said percussion pin (50) and including a spring (44) biasing said back head into said trajectory path of said percussion pin (50), said breech block (13) being formed to be movable into a closed position in which said tooth (39) of said top front portion of said internal balancing lever (37) lies counterposed to and a short distance from said tooth (36) of said breech (10); and
an oblong body (70) with a top portion and with a lower portion (72) constituting a trigger portion, said oblong body (70) having an arm (74) with a top edge (75) extending from said top portion of said oblong body (70), said trigger portion (72) projecting from said aperture (73) in said hand grip (11), said percussion pin (50) being movable into a cocked position when said holding means (53) grips said back head (40) of internal balancing lever (37), said oblong body (70) having an articulation (71) close to said arm (74) inside said hand grip (11) so that said oblong body (70) rotates about said articulation (71) when said trigger portion (72) is squeezed inward relative to said hand grip (11) thereby initiating a stroke, said trigger portion (72) being formed to move along a short section of said stroke in which said edge (75) of said arm (74) is thrust against said convex ridge (41) of said internal balancing lever (37) to cause rotation of said internal balancing lever (37) so that said tooth (39) of said internal balancing lever (37) fits onto said tooth (36) of said breech (10) to thereby lock said breech block (13) with said breech (10), said trigger portion (72) being thereafter further movable along said stroke to cause a further rotation of said internal balancing lever (37) which tightens a grip between said tooth (36) of said breech (10) and said tooth (39) of said internal balancing lever (37) and also releases said back head (40) from said holding means (53) and therefore said percussion pin (50) so that said percussion pin (50) consequently moves forward sharply to contact the cartridge (15) and cause the cartridge to explode.

* * * * *